United States Patent

McKechnie

[15] 3,666,895

[45] May 30, 1972

[54] FILM RECORDED VELOCITY AND DYNAMIC GAIN CONTROL MECHANISM

[72] Inventor: John C. McKechnie, Maitland, Fla.

[73] Assignee: The United States of America as represented by the Secretary of the Navy

[22] Filed: Mar. 9, 1971

[21] Appl. No.: 122,400

[52] U.S. Cl. ............179/100.3 D, 179/100.1 S, 179/100.3 Z

[51] Int. Cl. ................G11b 7/00, G11b 15/44, G11b 77/32

[58] Field of Search...........179/100.3 D, 100.3 Z, 100.3 GN, 179/100.1 S, 100.2 S, 100.4 D; 178/6.6 P, 6.7 A

[56] References Cited

UNITED STATES PATENTS 1,860,502 5/1932 Hansen..........................179/100.3 D 1,976,355 10/1934 Mees..............................179/100.3 D 1,989,965 2/1935 Beverage........................179/100.3 D 2,299,410 10/1942 Reiskind........................179/100.3 D

*Primary Examiner*—Bernard Konick

*Assistant Examiner*—Raymond F. Cardillo, Jr.

*Attorney*—Richard S. Sciascia, John W. Pease and Harvey A. David

[57] ABSTRACT

A film drive seed and gain regulated record and playback apparatus records a control track simultaneously with other parallel data tracks. The control track comprises a series of bars recorded at a predetermined frequency and having density representing the dynamic gain range of the recorded data. After processing, the control track is monitored and variations in density utilized to produce playback gain control signals for maintaining system dynamic range. Frequency of the bars during playback is compared with a known frequency by a mixer and a discriminator to provide speed control voltage signals.

5 Claims, 3 Drawing Figures

INVENTOR
JOHN C. McKECHNIE

BY Harvey A. David
John W. Pease
ATTORNEYS

INVENTOR
JOHN C. McKECHNIE

BY Harvey A. David

ATTORNEYS

FILM RECORDED VELOCITY AND DYNAMIC GAIN CONTROL MECHANISM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates to optical recording on film and playback thereof, and more particularly to improved means for regulating film drive speed and amplification gain to assure fidelity of playback.

Magnetic recordings, for example, of sonar signals for use in training devices, have been found to have a short useful life due to mechanical stresses imposed by the high tape speeds necessary to accommodate the large, time multiplexed bandwidth needed for effective sonar simulation. Moreover, playback apparatus using magnetic tape recordings for this purpose have not included any means for effecting dynamic gain compensation to correct for variations in the recordings due to wear, exposure to magnetic fields, and the like.

It has been proposed that such high speed magnetic tape equipment be replaced by light and sensitized film recording utilizing actinic film strip such as motion picture film, and utilizing a plurality of closely spaced recording and reading elements or "heads." By using a large number of parallel channels, relatively slow film speeds may be used to record the same bandwidth and mechanical wear can be substantially eliminated both because of lower speeds and because optical recording and playback does not require the intimate contact between film and head as does magnetic recording.

Among the problems attendant the use of such optical recording on film for playback are the fact that film recordings are subject to variations in amplitudes represented on the film as scales of grey, and some changes in film length due to processing and storage. The former results from stray exposure and variations of age of film before processing and obviously affects the validity of information content with respect to amplitude. The latter affects the playback speed of the recorded information and hence introduces frequency anomalies in the output.

SUMMARY OF THE INVENTION

With the foregoing in mind, it is a principal object of this invention to provide in an optical recording and playback system, improved means for regulating the speed of film travel during the playback phase so that the speed at which the recorded matter is played back substantially equals the speed at which it was recorded.

Another object of the invention is the provision of means for automatically controlling output gain so as to compensate for variations in the processed film dynamic range.

As another object this invention aims to accomplish the foregoing through the provision of a maximum to minimum dynamic range and time base control track recorded on the film, conveniently at the time of information recording, and apparatus for monitoring the dynamic range and time base control track and utilizing it to control output gain and film speed.

Yet another object is to provide novel control apparatus for film speed and gain control which utilizes as the ultimate standard or reference a reliable master clock frequency source such as a crystal controlled oscillator.

The invention may be further said to reside in certain combinations and arrangements of cooperating elements which achieve the foregoing objects and advantages as well as others which will become apparent from the following description of a preferred embodiment when read in conjunction with the accompanying drawings.

DESCRIPTION OF THE PREFERRED EMBODIMENT

Figure 1:
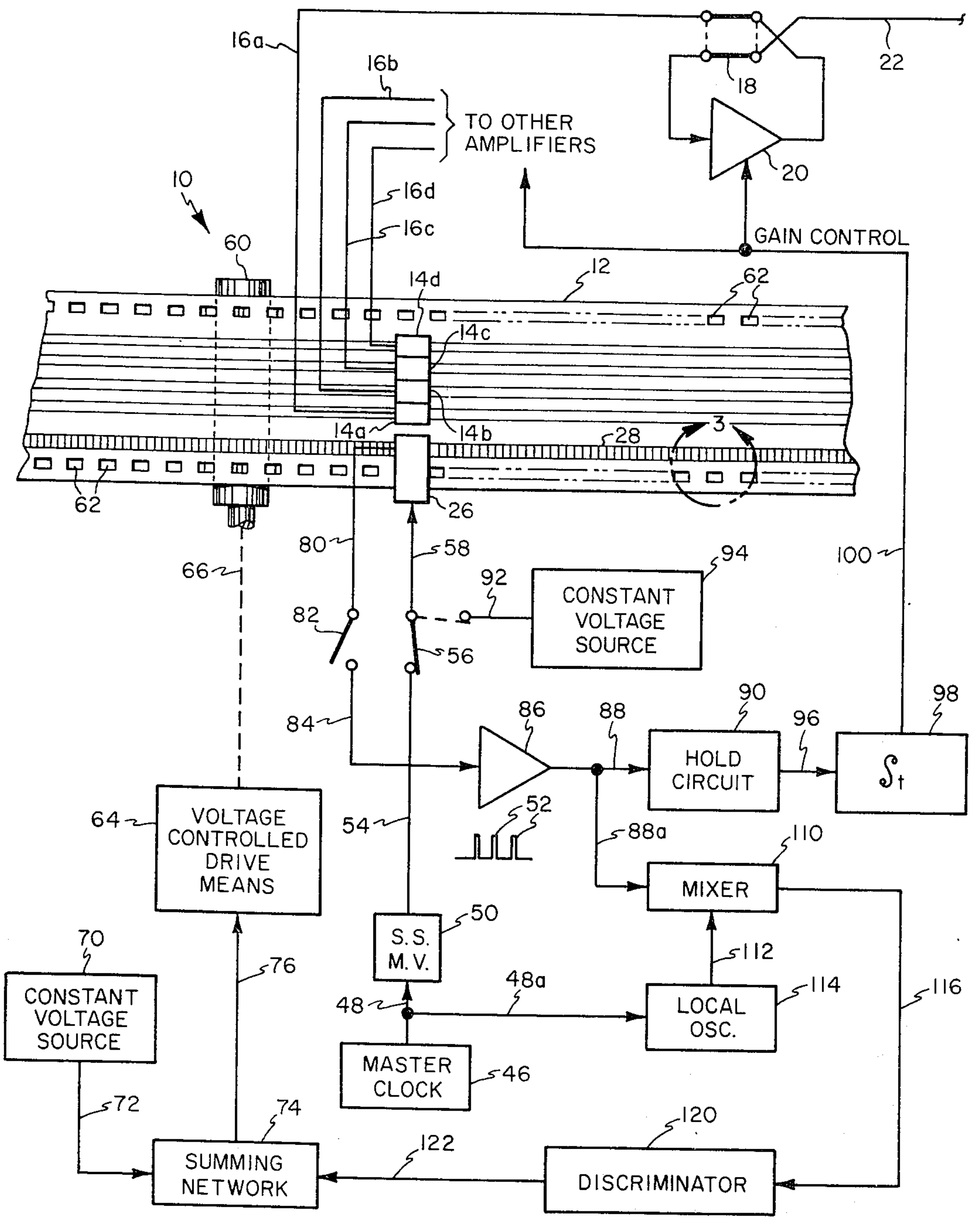
FIG. 1 is a diagrammatic illustration in block form of a recording and playback apparatus embodying speed and gain control according to the invention.

Illustrated in the drawings and described hereinafter is a multiple track record and playback apparatus, generally indicated at 10, which utilizes photographic film strip 12 and embodies film speed and dynamic gain control means according to the invention. The apparatus 10 comprises a plurality of record and playback elements **14*a*, 14*b*, 14*c*, and 14*d* of which the element 14*a* is connected as shown by line 16 and a reversing switch 18 to an audio frequency amplifier 20. The amplifier 20 is connected through switch 18, which is shown in recording position, to an input and output line 22. The other elements 14*b* – 14*d* are connected by lines 16*b* – 16*d*** to corresponding reversing switches and amplifiers (not shown). The record and playback elements may be of any conventional construction such as those which utilize a light source and a photo-cell.

Figure 2:
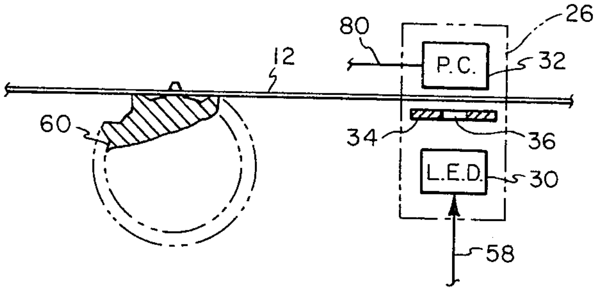
FIG. 2 is a diagrammatic illustration in block form further illustrating a portion of the apparatus of FIG. 1.

Mounted adjacent the elements **14*a* – 14*d* is a control track recording and playback element 26 which is arranged to record a control track 28 on the film 12 during recording by the elements 14*a* – 14*d*. The control track recording and playback element 26, best illustrated in FIG. 2, comprises a light source which is desirably in the form of a light emitting diode 30 on one side of the film 12 and a photo-cell 32 on the other side. An aperture plate 34 having an aperture 36 in the form of a slit of predetermined dimensions discussed later is interposed between the light emitting diode 30 and the film 12**.

Figure 3:
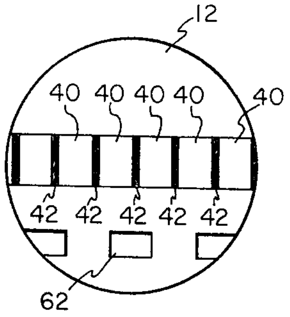
FIG. 3 is a fragmentary view, on an enlarged scale, of the portion within the circle 3 of FIG. 1.

The light emitting diode 30 is adapted to be pulsed during recording so as to produce a control track 28 comprising a series of alternating minimum and maximum density areas or bars, indicated respectively as 40 and 42 in FIG. 3. The widths of the bars 40, 42 are a function of the film travel velocity, the size of the aperture 36, and the duration of light emission by the light emitting diode 30. The difference in recorded density or grey levels between adjacent minimum and maximum bars 40, 42 is a function of factors including the dynamic range of the matter to be recorded by elements **14*a* – 14*d***, the condition of the film prior to recording (e.g. stray exposute, storage time, etc.) and the results of processing or developing.

Flashing of the light emitting diode 30 during recording is effected at a frequency established by a master clock 46 which is connected as shown by line 48 to control a single shot multivibrator 50. The output pulses 52 of the multivibrator 50 are applied as indicated by line 54, switch 56 and line 58 to the diode 30.

The film 12 is driven during recording by a drive sprocket 60 which engages the usual openings 62 in the film edges and is rotated by a voltage controlled drive means 64 having suitable mechanical connection 66 to the sprocket. The drive means 64 may be of any conventional type wherein speed is controlled by the voltage input thereto. In the present apparatus there is provided a constant voltage source 70 having its output applied via line 72 as one input to a summing network 74. The output of the summing network 74 on line 76 is applied to control the speed of the drive means 64 and hence the velocity of the film 12.

The photo-cell 32 of the control track record and playback element 26 is inoperative during recording but is connected during playback by a line 80, a switch 82, and a line 84 to the input of an isolation amplifier 86. The output of the amplifier 86 on line 88 is applied to a hold circuit 90. The light emitting diode 30, during playback, is connected via line 58, switch 56 in its dotted line position, and a line 92 to a constant voltage source 94 so as to provide a constant light level directed toward the photo-cell 32. The voltage output of the photo-cell 32 varies in accordance with the modulation of the light by the passing minimum and maximum density bars 40, 42 of the film control track 28. The hold circuit 90 samples and holds the peak to peak output of the photo-cell 32.

The output of the hold circuit 90 is applied via line 96 to an integrator 98 which integrates the peak to peak value with respect to time to provide a gain control signal as an output on line 100 to the audio amplifier 20.

Because processing, storage, and other factors cause the film 12 to shrink and stretch to usually unpredictable and variable degrees along its length, if the film were driven during playback at precisely the same speed as during recording, the output of the apparatus would be distorted, particularly in frequency. The invention utilizes the fact that the control track 28 will experience the same dimensional changes as the adjacent recorded matter to provide speed control so that the film 12 will be driven at such a speed that the output of the apparatus will have unusually good fidelity particularly with respect to frequency.

To that end, a portion of the output of the amplifier 86 is applied via line 88*a* as one input to a mixer 110. The other input to the mixer 110 via line 112 is a frequency generated by a local oscillator 114 which is conveniently regulated by the master clock 46 as shown by line 48*a*. A local oscillator frequency is selected to be representative of the nominal frequency which would be derived from the amplifier 86 if there were no shrinkage or elongation of the film 12.

During playback it will be understood that the switch 18 is in its dotted line position so that the output of the apparatus is taken from line 22.

The mixer 110 provides as its output the sum and difference of the local oscillator frequency and the frequency output of the amplifier 86. The latter frequency, of course represents the rate at which the control track maximum and minimum density areas pass the control track record and playback element 26. The output of the mixer 110, represented by flow line 116, is fed to a discriminator 120. The discriminator 120 may be of any conventional construction so long as it is capable of converting the frequency variations of the output of the mixer 110 into an output voltage which varies in amplitude and polarity as the frequency output of amplifier 86 varies from the nominal frequency at which the control track was recorded. The discriminator output voltage is passed, as shown by line 122, as a second input to the summing network 74.

The summing network 74 combines the discriminator output voltage with the constant voltage from source 72 to vary the voltage of line 76 to speed up or slow down the drive means 64 and the speed of the film 12 as necessary to maintain the film speed such that the output of the apparatus 10 on line 22 is accurate as to frequencies as well as to dynamic range as assured by the aforedescribed gain control.

Because of the film speed control effected by the invention it will be recognized that other film drives than the sprocket 60, including those which are less positive in transmission such as reel drives, may be used without degrading the output.

Obviously many modifications and variations of the present invention are possible in the light of the above teachings. It is therefore to be understood that within the scope of the appended claims the invention may be practiced otherwise than as specifically described.

What is claimed is:

1. Apparatus utilizing actinic film strip for recording and subsequent playback, said apparatus comprising:

voltage controlled drive means operative to drive said film strip at speeds corresponding to voltage applied to said drive means;

a first constant voltage source;

summing network means connected to receive the output of said first constant D.C. voltage source as one input thereto, said first constant voltage source having its output connected to said voltage controlled drive means;

a plurality of data record and playback means arranged to record data in parallel data tracks on said film strip as said film strip is moved by said drive means;

control track record and playback means disposed adjacent said data record and playback means, said control track record and playback means comprising voltage modulated light source means disposed on one side of said film strip and light responsive means on the opposite side of the film strip;

variable gain first amplifier means;

means connecting said first amplifier means to said data record and playback means for amplification of signals during playback of data;

master clock means;

single shot multivibrator means responsive to said master clock means to generate impulses of predetermined duration, frequency and voltage;

means for connecting said single shot multivibrator to said light source means for modulation thereof for effecting recording of alternating maximum and minimum conditions as said control track simultaneously with recording of said data tracks;

second constant voltage source;

means for connecting said second voltage source to said light source for constant operation during playback so that said light responsive means provides a signal having a frequency related to speed of travel of said film and having amplitude related to variations in film conditions;

second amplifier means;

means connecting said second amplifier means to receive the output of said light responsive means;

hold circuit means connected to receive a portion of the output of said second amplifier means and operative to provide an output voltage corresponding to peak to peak voltage input from said second amplifier means;

integrator means connected to receive and operative to integrate the output of said hold circuit means with respect to time to provide a gain control signal representative of changes in total dynamic gain along the film strip;

said first amplifier means being responsive to said gain control signals to regulate output of the apparatus during playback such that compensation is effected for variations from recorded values.

2. Apparatus as defined in claim 1, and further comprising:

local oscillator means connected to said master clock means and operative to provide as an output a signal of predetermined frequency related to the frequency at which said control track was recorded;

mixer means operative to combine the output frequencies of said local oscillator and of said second amplifier means to provide sum and difference frequencies thereof;

discriminator means connected to receive the output of said mixer means and to provide a D.C. error voltage representative of variations of speed of film travel from that required to provide an output frequency from said light responsive means which would equal the frequency at which said control track was recorded;

said summing network being connected to receive said D.C. error voltage as a second input thereto, said summing network being operative to combine said error voltage with the output of said first constant D.C. voltage source to provide a control voltage to said voltage controlled drive means which will provide a film speed such that playback of data from said data tracks is at the same speed as that at which it was recorded irrespective of subsequent changes in film length.

3. Apparatus as defined in claim 2, and wherein:

said voltage modulated light source means comprises a light emitting diode.

4. Apparatus as defined in claim 3, and wherein:

said means connecting said first amplifier means to said data record and playback means comprises reversing switch means operable to connect the output of said first amplifier means to said data record and playback means for use during recording.

5. Apparatus as defined in claim 3, and wherein:

said control track record and playback means comprises aperture defining means disposed between said light emitting diode and said film.

* * * * *